(12) United States Patent
Lehnert et al.

(10) Patent No.: US 12,480,491 B2
(45) Date of Patent: Nov. 25, 2025

(54) LIQUID PUMP AND METHOD FOR ASSEMBLING A LIQUID PUMP

(71) Applicant: Valeo Powertrain GmbH, Ebern (DE)

(72) Inventors: Alexander Lehnert, Ebern (DE); Manuel Merkle, Ebern (DE); Frank Sauerteig, Ebern (DE); Karin Fecke, Ebern (DE); Süleyman Yildirim, Ebern (DE)

(73) Assignee: Valeo Powertrain GmbH, Ebern (DE)

( * ) Notice: Subject to any disclaimer, the term of this patent is extended or adjusted under 35 U.S.C. 154(b) by 485 days.

(21) Appl. No.: 17/590,131

(22) Filed: Feb. 1, 2022

(65) Prior Publication Data

US 2022/0243729 A1 Aug. 4, 2022

(30) Foreign Application Priority Data

Feb. 2, 2021 (DE) .................... 10 2021 102 395.5

(51) Int. Cl.
*F04B 53/22* (2006.01)
*F04B 17/03* (2006.01)
(Continued)

(52) U.S. Cl.
CPC .............. *F04B 53/22* (2013.01); *F04B 17/03* (2013.01); *F04C 11/008* (2013.01);
(Continued)

(58) Field of Classification Search
CPC ...... F04C 2/10; F04C 2/22; F04C 2/26; F04C 11/008; F04C 15/0096; F04C 15/008;
(Continued)

(56) References Cited

U.S. PATENT DOCUMENTS 3,742,595 A * 7/1973 Lykes ................... H02K 15/12
310/43
6,232,687 B1 5/2001 Hollenbeck et al.
(Continued)

FOREIGN PATENT DOCUMENTS

CA   2 329 491 A1   9/2000
CN   111095733 A    5/2020
(Continued)

OTHER PUBLICATIONS

German Search Report issued Sep. 30, 2021 in German Application 10 2021 102 395.5 filed on Feb. 2, 2021, pages (with English Translation of Categories of Cited Documents & Written Opinion).
(Continued)

*Primary Examiner* — Mark A Laurenzi
*Assistant Examiner* — Chirag Jariwala
(74) *Attorney, Agent, or Firm* — Oblon, McClelland, Maier & Neustadt, L.L.P.

(57) ABSTRACT

A liquid pump having a housing, an electric motor formed by a stator assembly arranged in the housing and a rotor, a liquid duct, a printed circuit board and a temperature sensor assembly which is received in the housing and has a temperature sensor associated with the liquid duct, the stator assembly and/or the temperature sensor assembly having at least one press-in contact which engages into a press-in opening in the printed circuit board, an alignment mechanism is provided, by way of which the press-in contact may be directly aligned relative to the printed circuit board.

16 Claims, 10 Drawing Sheets

(51) Int. Cl.
*F04C 11/00* (2006.01)
*F04C 15/00* (2006.01)

(52) U.S. Cl.
CPC ........ *F04C 15/008* (2013.01); *F04C 2240/30* (2013.01); *F04C 2240/808* (2013.01); *F04C 2240/81* (2013.01); *F04C 2270/19* (2013.01)

(58) Field of Classification Search
CPC ............ F04C 2230/603; F04C 2240/30; F04C 2240/40; F04C 2240/70; F04C 2240/80; F04C 2240/803; F04C 2240/808; F04C 2240/81; F04C 2270/19; F04B 17/03; F04B 53/22; H02K 1/18; H02K 1/185; H02K 15/14; H02K 15/16
See application file for complete search history.

(56) References Cited

U.S. PATENT DOCUMENTS

| | | | | |
|---|---|---|---|---|
| 2001/0015584 | A1* | 8/2001 | Paulus-Neues et al. | ..................... H02K 7/006 310/75 D |
| 2016/0377082 | A1* | 12/2016 | Fecke | ................. H02K 1/2706 417/420 |
| 2017/0082104 | A1 | 3/2017 | Yamamoto et al. | |
| 2020/0044512 | A1* | 2/2020 | Bourqui | ................. H02K 15/14 |
| 2020/0274405 | A1 | 8/2020 | Csoti et al. | |
| 2020/0366140 | A1* | 11/2020 | Roos | ..................... H02K 1/185 |
| 2022/0190692 | A1* | 6/2022 | Christian | ............... H02K 3/522 |
| 2023/0299634 | A1* | 9/2023 | Mitteer | .................. H02K 3/522 417/410.4 |
| 2023/0332599 | A1* | 10/2023 | Wan | ....................... H02K 11/30 |

FOREIGN PATENT DOCUMENTS

| | | |
|---|---|---|
| DE | 1 174 378 A | 7/1964 |
| DE | 10 2013 220 557 A1 | 4/2015 |
| DE | 10 2013 017 975 A1 | 6/2015 |
| DE | 10 2020 106 849 A1 | 9/2021 |
| WO | WO 2020/100042 A1 | 5/2020 |

OTHER PUBLICATIONS

Extended European Search Report issued Jun. 1, 2022 in European Patent Application No. 22154220.2, 7 pages.

* cited by examiner

LIQUID PUMP AND METHOD FOR ASSEMBLING A LIQUID PUMP

The invention relates to a liquid pump having a housing, an electric motor formed by a stator assembly arranged in the housing and a rotor, a liquid duct, a printed circuit board and a temperature sensor assembly which is received in the housing and has a temperature sensor associated with the liquid duct, the stator assembly and/or the temperature sensor assembly having at least one press-in contact which engages into a press-in opening in the printed circuit board. The invention also relates to a method for assembling a liquid pump.

Such a liquid pump may be used for supplying oil to a transmission or other components in a drive train. The drive motor is actuated by a controller. In order to be able to regulate the flow of liquid in the desired manner, the temperature sensor is provided since the temperature has a major influence on the viscosity of the liquid to be pumped.

The temperature sensor itself is arranged on a carrier which, in turn, is received in the housing. Here, two stamped contacts are usually embedded in the carrier, the temperature sensor being soldered to one end of the said stamped contacts and the other end of the said stamped contacts being designed as press-in contacts which are pressed into the printed circuit board.

The stator assembly and the temperature sensor assembly are usually installed in the housing before the printed circuit board is fitted in the housing. Therefore, it is necessary to ensure that the press-in contacts are correctly aligned relative to the press-in openings. On account of the usually unavoidable tolerance chains, this leads to a high level of complexity.

The object of the invention is to develop a liquid pump of the kind mentioned at the outset such that a cost-effective design and a simple assembly result.

This object is achieved by a liquid pump having a housing, an electric motor formed by a stator assembly arranged in the housing and a rotor, a liquid duct, a printed circuit board and a temperature sensor assembly which is received in the housing and has a temperature sensor associated with the liquid duct, the stator assembly and/or the temperature sensor assembly having at least one press-in contact which engages into a press-in opening in the printed circuit board, an alignment mechanism is provided, by way of which the press-in contact may be directly aligned relative to the printed circuit board. The invention is based on the basic idea of directly aligning the press-in contact relative to the press-in opening and not, as in the prior art, indirectly via different components, this leading to tolerance chains. Therefore, according to the invention, less stringent requirements may be made in respect of the position of the various components in the housing, this simplifying assembly and reducing costs.

According to one embodiment, the alignment mechanism has at least one guide opening in the stator assembly and/or in the temperature sensor assembly. By way of a guide opening, the stator assembly and/or the temperature sensor assembly may be aligned relative to the printed circuit board in an extremely simple manner. The guide opening may be moulded, for example, in an injection-moulding die, using which the carrier is produced.

According to one refinement, it is provided that the alignment mechanism has a guide opening in the printed circuit board. Here too, the desired guide and alignment function may be implemented by way of a very simple design feature which may be produced, for example, by drilling when the printed circuit board is produced.

Here, the guide opening may have a circular cross section since this can be produced in a very simple manner, for example, using a drill. A round guide element may then also be used, and this can be provided with a low level of complexity.

According to an alternative embodiment, the guide opening has a cross section which allows non-rotatable engagement of a guide element. In this case, for example, a rectangular or cruciform guide element may be used, as a result of which rotation prevention is also achieved in addition to an alignment function.

According to a preferred embodiment, the guide opening has an insertion bevel, as a result of which the guide element automatically finds the guide opening even when there is a certain lateral offset, as a result of which the assembly process is accelerated.

According to one embodiment, the alignment mechanism has a guide element which engages into the guide opening. The guide element serves to align the stator assembly and/or the temperature sensor assembly and therefore the press-in contact relative to the printed circuit board, without complicated measures being required.

The guide element is preferably a separate component which is used only temporarily during assembly and is removed again afterwards. According to an alternative embodiment, the guide element is fitted to the stator assembly and/or the temperature sensor assembly or the printed circuit board, for example clipped into an opening of the printed circuit board or injection-moulded onto the carrier of the stator assembly and/or the temperature sensor assembly. As a result, the complexity of assembly may be further simplified, and the number of components is reduced.

According to one embodiment, the stator assembly and/or the temperature sensor assembly has/have at least one stop element which bears against a contact face on the housing, which contact face limits a press-in depth of the stator assembly and/or the temperature sensor assembly and/or a rotation of the stator assembly and/or the temperature sensor assembly about an axis parallel to the press-in direction. The stop element serves firstly as an abutment which absorbs the forces which are exerted when the press-in contact is pressed into the press-in opening of the printed circuit board. Secondly, the position of the stator assembly and/or the temperature sensor assembly in the housing in a vertical direction is precisely defined by means of the stop element. Given a suitable configuration, the stop element can also prevent the stator assembly and/or the temperature sensor assembly from rotating in the housing.

Here, the stator assembly and/or the temperature sensor assembly may have, on its side adjacent to the printed circuit board, a transverse bar which has the guide opening and the stop element, as a result of which a simple design of the stator assembly and/or the temperature sensor assembly is achieved.

According to one refinement, the stator assembly and/or the temperature sensor assembly is/are provided with at least one positioning wing which is received in a slot in the housing. Since the positioning wing is pushed into the slot, the position of the stator assembly and/or the temperature sensor assembly in the housing is precisely established in the region of the positioning wing. In particular, the position of the stator assembly and/or the temperature sensor assembly is precisely established in respect of a rotation about its longitudinal axis. The position of the press-in contact relative to the printed circuit board is then determined by means of the alignment mechanism.

Here, the positioning wing may be provided with two clamping elements which are arranged on mutually opposite sides of the positioning wing and bear against mutually opposite sides of the slot with prestress. The clamping elements serve as integrated compensation means for any possible tolerances since they are so flexible that, if the slot in the housing is narrower than its nominal size, they yield or become entrenched in the walls of the slot. Irrespective of any possible tolerances, this ensures that the stator assembly and/or the temperature sensor assembly is/are always correctly aligned.

It may also be provided that the stator assembly and/or the temperature sensor assembly is/are provided with a plurality of guide fins which, together with the walls of the slot in the housing, ensure that the stator assembly and/or the temperature sensor assembly is/are received in the slot in a pre-aligned manner such that the press-in contacts find the associated press-in openings during assembly of the printed circuit board and during the press-in process.

According to the invention, a method for assembling a liquid pump is also provided, wherein the following steps are provided:
- a stator assembly and/or a temperature sensor assembly, which is/are provided with at least one press-in contact and a guide opening, is inserted into a receiving slot,
- a printed circuit board, which has at least one press-in opening for the press-in contact and a guide opening, is provided, wherein a guide element is inserted into the guide opening of the printed circuit board,
- the printed circuit board is installed in the housing, wherein the guide element engages into the guide opening of the stator assembly and/or the temperature sensor assembly before the press-in contact engages into the press-in opening,
- the guide element is removed once the printed circuit board is in its position in which the press-in opening is pushed onto the press-in contact.

With regard to the resulting advantages, reference is made to the above explanations. This additionally results in the advantage that the "tool" of the alignment mechanism, that is to say the guide element, may be reused and a new guide element is not required for each pump for assembly.

The invention will be described below on the basis of various embodiments, which are illustrated in the appended drawings. In these drawings.

Figure 1:
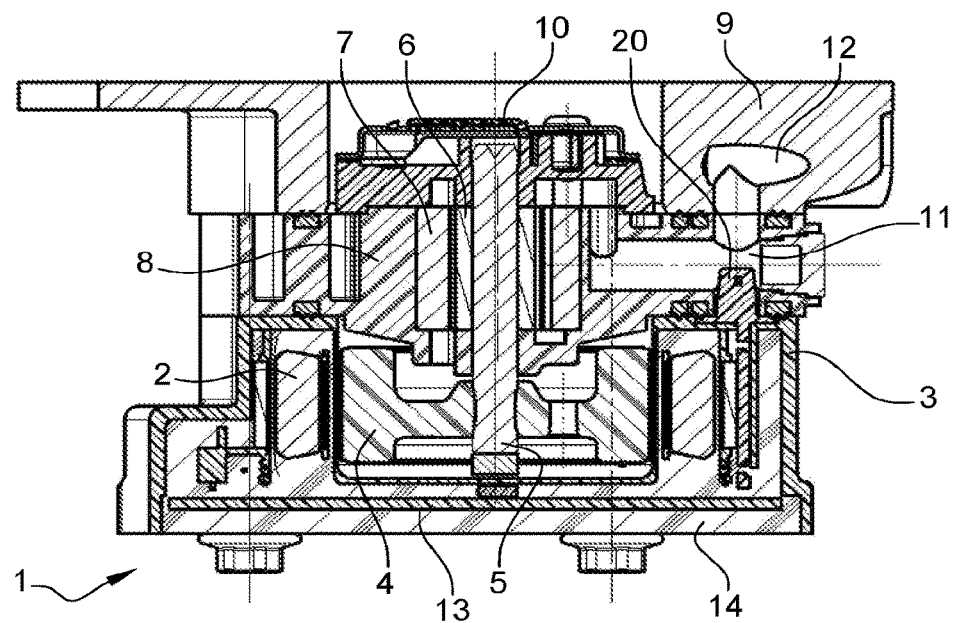
FIG. 1 shows a sectional view of a pump according to the invention.

FIG. 1 shows a liquid pump 1 which has an electric motor and a rotor. The electric motor is formed by a stator assembly 2, which is arranged in a motor housing part 3, and a rotor 4. The stator assembly 2 comprise a plurality of windings and an electrical connection portion. The rotor 4 is connected to a rotor 6, which meshes with an annular gear 7 here, via a drive shaft 5. The rotor 6 and the annular gear 7 are received in a pump housing 8.

The motor housing 3 and the pump housing 8 together form the housing of the pump.

In the exemplary embodiment shown, the pump is a gerotor pump. However, other refinements are possible, for example a centrifugal pump or a vane-type pump.

The liquid pump 1 is fitted to a transmission housing 9 and draws, for example, a hydraulic oil directly from the said transmission housing. A screen 10 is arranged on the suction side here.

The liquid is discharged from the rotor 6 to a liquid duct 11, from which it may be passed on to a distribution duct 12. From the said distribution duct, the liquid may be passed on, for example, to lubrication points in the transmission.

A printed circuit board 13, which may be populated with components for actuating the electric motor, is received in the motor housing 3. A sensor for detecting the position of the shaft 5 may also be arranged on the printed circuit board.

The printed circuit board 13 is potted in the motor housing 3 by means of a potting compound 14.

Figure 2:
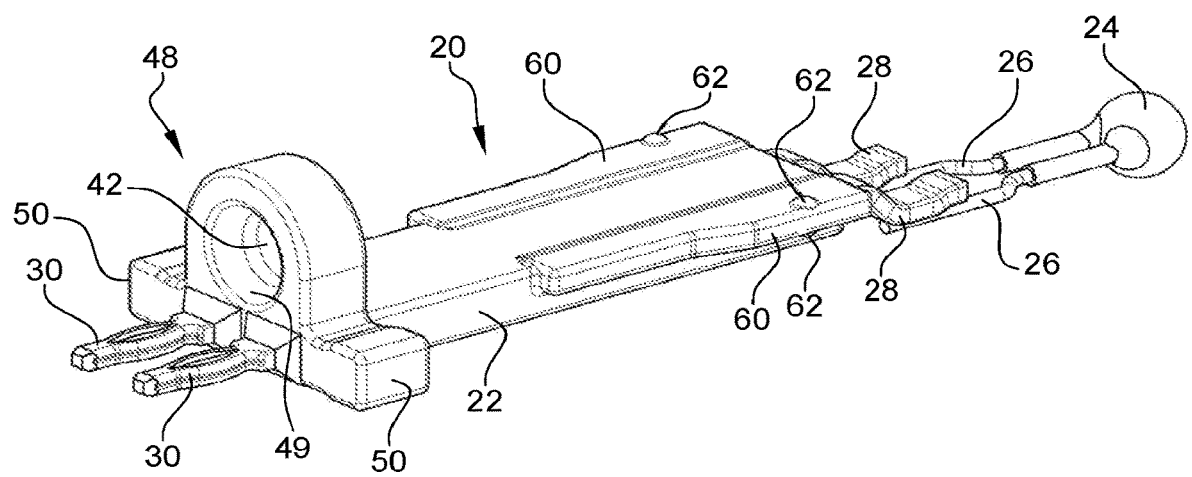
FIG. 2 shows a perspective view of a temperature sensor assembly used in the pump in FIG. 1.

A temperature sensor assembly 20 is also fitted to the printed circuit board 13 (also see FIG. 2), and the temperature of the conveyed liquid may be detected using the said temperature sensor assembly.

The temperature sensor assembly 20 has a carrier 22, which serves for fitting the said temperature sensor assembly in the housing 3, 8 of the pump 1, and the actual temperature sensor 24. The said temperature sensor has two connection wires 26 which are electrically conductively connected to two stamped contacts 28. The stamped contacts 28 are received in the carrier 22, for example injection-moulded there.

That end of the two stamped contacts 28 opposite the temperature sensor 24 is embodied as a press-in contact 30 in each case. Each press-in contact 30 is pressed into a press-in opening 32 associated with it (see FIGS. 3 and 4 for example), the said press-in openings being formed in the printed circuit board 13.

Figure 6:
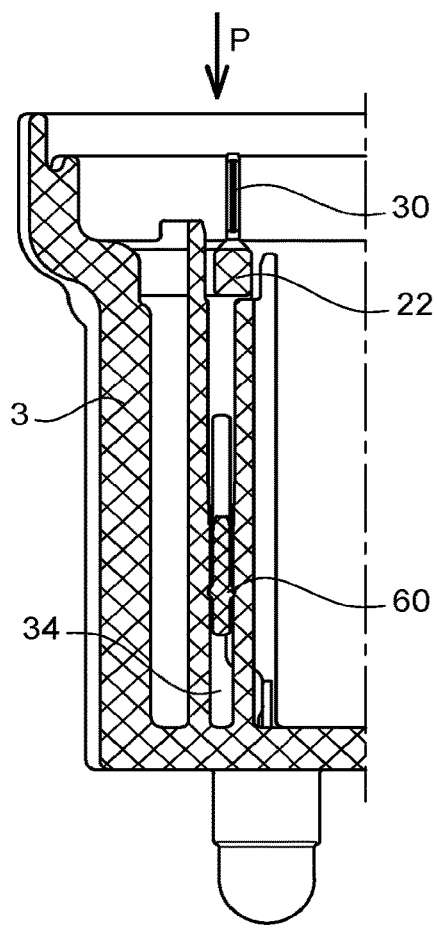
FIG. 6 shows a section view along the plane VI-VI in FIG. 8.
Figure 7:
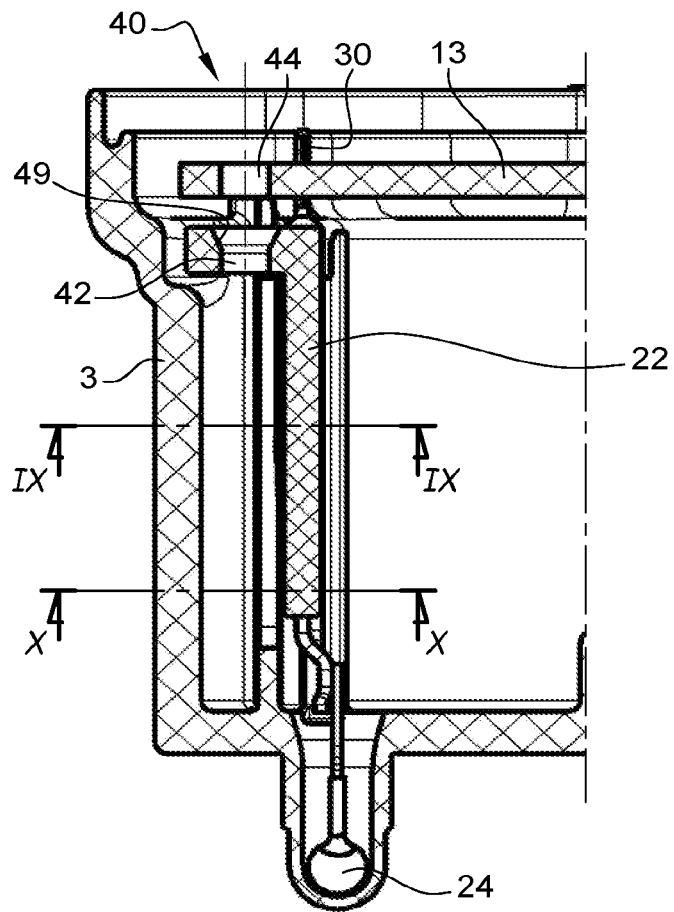
FIG. 7 shows a section view along the plane VII-VII in FIG. 4.
Figure 8:
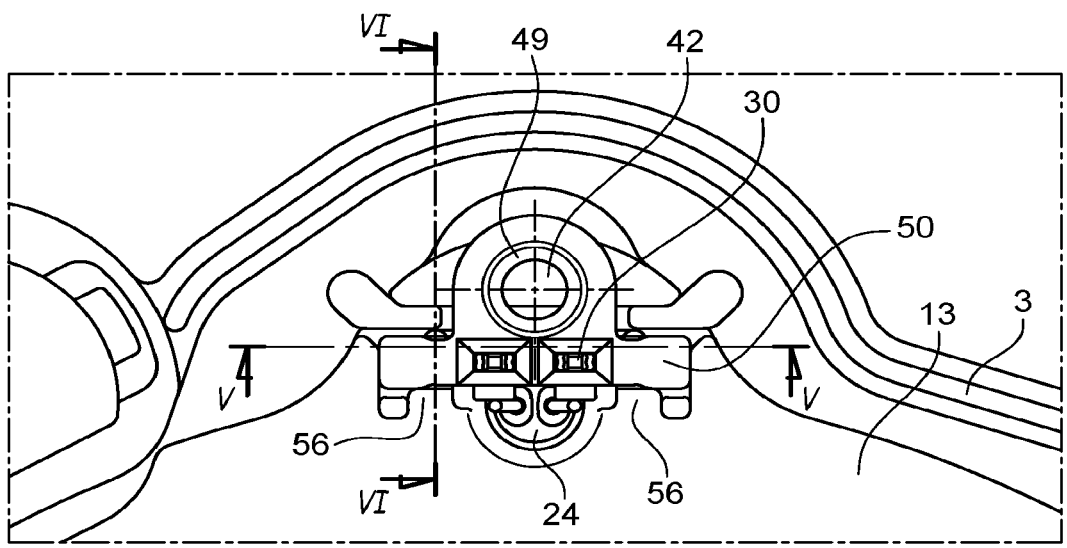
FIG. 8 shows a view in the direction of the arrow P in FIG. 6.
Figure 9:
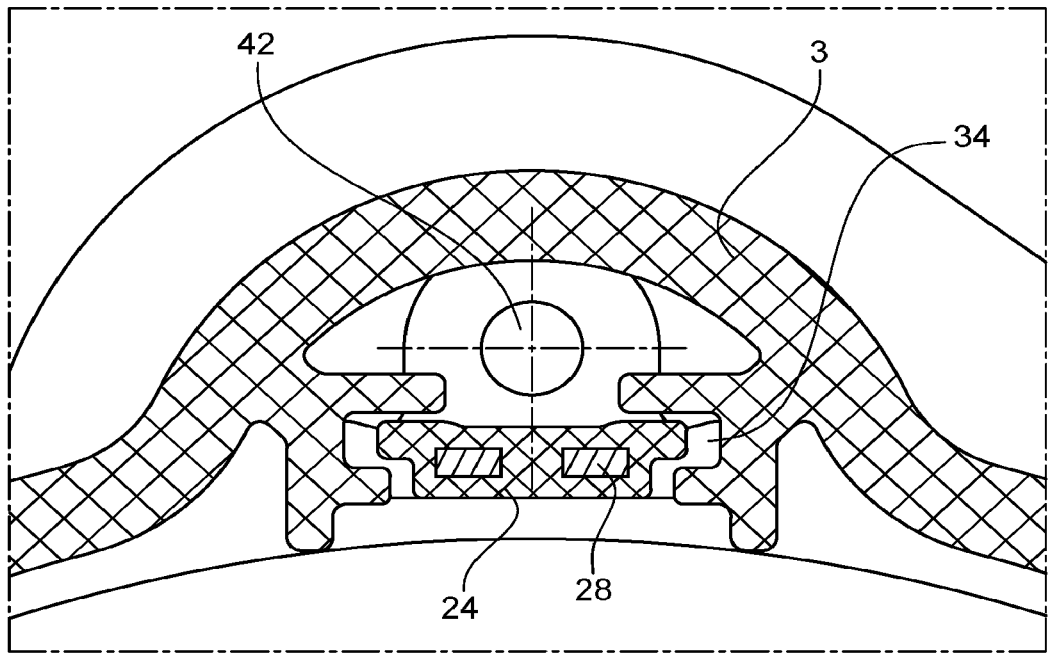
FIG. 9 shows a section view along the plane IX-IX in FIG. 7.

The temperature sensor assembly 20 is installed in the housing 3, 8 before the printed circuit board 13 is installed in the motor housing 3. In this case, a slot 34, into which the temperature sensor assembly 20 is pushed, is provided in the motor housing 3 for receiving the temperature sensor assembly 20 (see, for example, FIGS. 5 and 6). FIG. 6 shows the temperature sensor assembly 20 pushed into the motor housing 3 in a state in which the printed circuit board 13 is not yet installed. The state with the printed circuit board installed is shown in FIG. 7.

In order to be able to install the printed circuit board without problems, it is necessary for the press-in contacts 30 to be precisely aligned relative to the press-in openings 32. To this end, an alignment mechanism 40 is provided, by way of which that end of the temperature sensor assembly 20 associated with the printed circuit board may be directly and precisely aligned relative to the printed circuit board 13.

In the exemplary embodiment shown, the alignment mechanism 40 has three components: a guide opening 42 on the temperature sensor assembly 20, a guide opening 44 in the printed circuit board 13, and a guide element 46.

The guide opening 42 of the temperature sensor assembly 20 is formed in a transverse bar 48 which is formed at that end of the carrier 22 facing away from the temperature sensor 24. The transverse bar 48 has, in the centre, a region projecting from the broad side of the carrier 22, the guide opening 42 being formed in the centre of the said region. The guide opening 42 widens on the side of the press-in contacts 30, so that an insertion bevel 49 is formed.

Furthermore, the transverse bar 48 has two stop elements 50 projecting beyond the narrow sides of the carrier 22. Here, that side of the transverse bar facing the temperature sensor 24 forms a stop element 52 in each case.

The guide opening 44 in the printed circuit board 13 is arranged relative to the press-in openings 32 such that its distance and its position correspond to the position and the arrangement of the guide opening 42 relative to the press-in contacts 30.

Here, the guide element 46 is a separate, rod- or pin-like component which is used only for the purpose of installing the printed circuit board.

Figure 5:
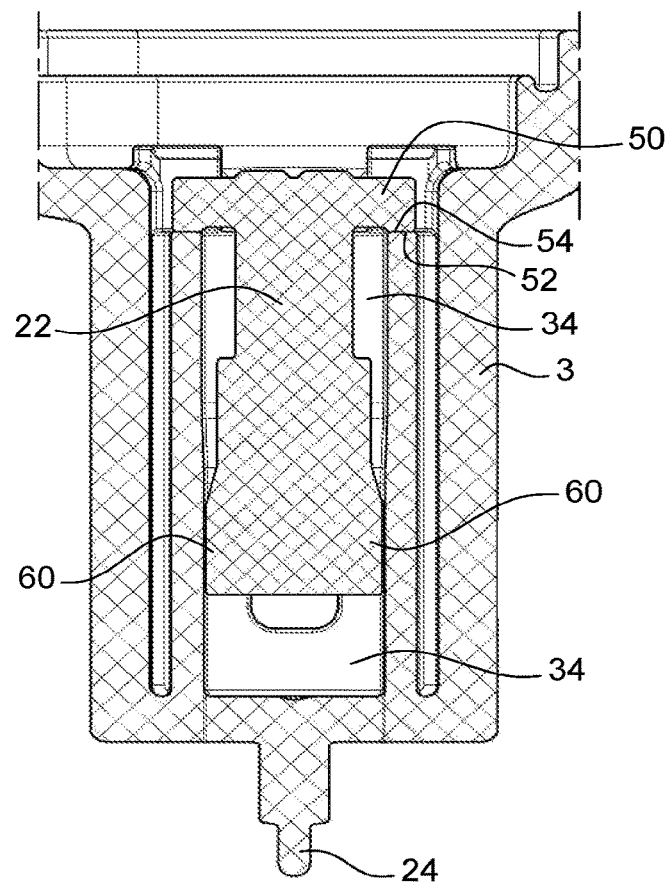
FIG. 5 shows a section view along the plane V-V in FIG. 8.

When installing the temperature sensor assembly 20, it is initially pushed into the slot 34 of the motor housing 3, until the stop element 52 of the transverse bars 50 bears against an associated contact face 54 in the motor housing 3 (see FIG. 5). The press-in depth of the temperature sensor assembly 20 is precisely defined in this way.

In this state, the "rear side" 55 of the transverse bar 50, that is to say the side facing away from the guide opening 42, with the two supporting faces 56 forms a distance which is large enough for the position tolerance of the printed circuit board 13 in relation to the temperature sensor assembly 20 to be able to be compensated for, but is small enough to sufficiently limit a rotation of the press-in zone so that the press-in zones can still find each other. Here, the distance is selected such that the guide element 46 and the guide opening 42 still find each other during assembly.

Figure 3:
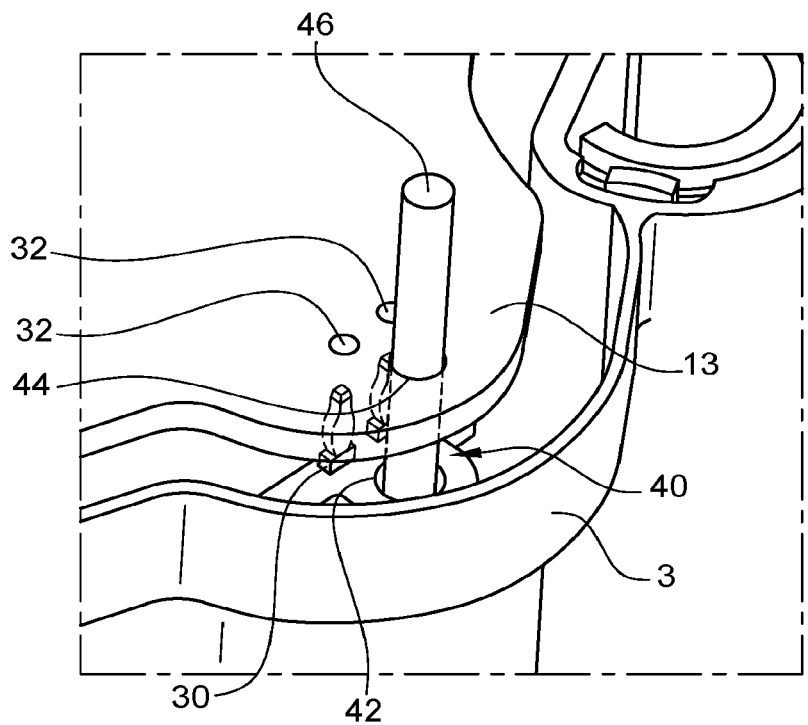
FIG. 3 shows a perspective partial view of the pump in FIG. 1 during an assembly step.
Figure 4:
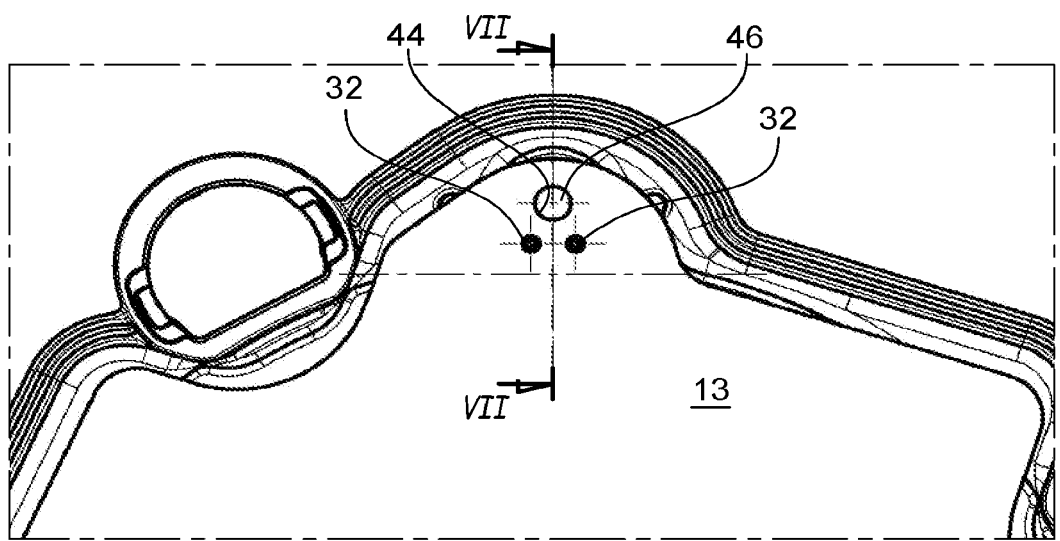
FIG. 4 shows a plan view of the detail in FIG. 3.

When the printed circuit board 13 is then intended to be installed, the guide element 46 is fitted in the guide opening 44 of the printed circuit board and the printed circuit board is mounted onto the motor housing 3. In so doing, the guide element 46 engages into the guide opening 42 of the temperature sensor assembly 20. The insertion bevel 49 may possibly ensure that the guide element 46 finds the guide opening 42. This state is shown in FIG. 3, in which the press-in openings 32 are at a small distance above the press-in contacts 30.

As soon as the guide element 46 engages into the guide opening 42, the printed circuit board 13 can be pushed so far into the motor housing 3 that the press-in openings 32 are pushed onto the press-in contacts 30. There is no risk here of an offset of the press-in contacts 30 relative to the press-in openings 32 occurring since the guide element 46 directly and correctly aligns the printed circuit board 13 and that end of the temperature sensor assembly 20 associated with the said circuit board relative to one another.

The forces exerted when the printed circuit board is pressed onto the temperature sensor assembly 20 are directly diverted into the motor housing 3 by the transverse bars 50 (see FIG. 5).

The alignment element 46 may be removed once the printed circuit board 13 is fully installed (see FIG. 7). A potting material may then be introduced.

In an alternative refinement, it is also possible for the alignment element 46 to be a plastic pin which is permanently pressed or clipped into the guide opening 44. The said plastic pin may then remain there after assembly. It is only relevant that the said plastic pin projects from the plane of the printed circuit board 13 by an amount which is greater than the distance between the end of the press-in contacts 30 and the top side of the guide opening 42. In other words: the guide element 46 has to engage into the guide opening 42 before the press-in contacts 30 make contact with the printed circuit board 13.

In order to also precisely position the temperature sensor assembly 20 on the side of the temperature sensor 24 in the interior of the motor housing 3, the carrier 22 has two positioning wings 60 which project beyond the two narrow sides of the carrier 22. Each positioning wing 60 may be provided with a clamping element 62, which is embodied as a small, stud-like projection in each case, on sides facing away from one another.

Figure 10:
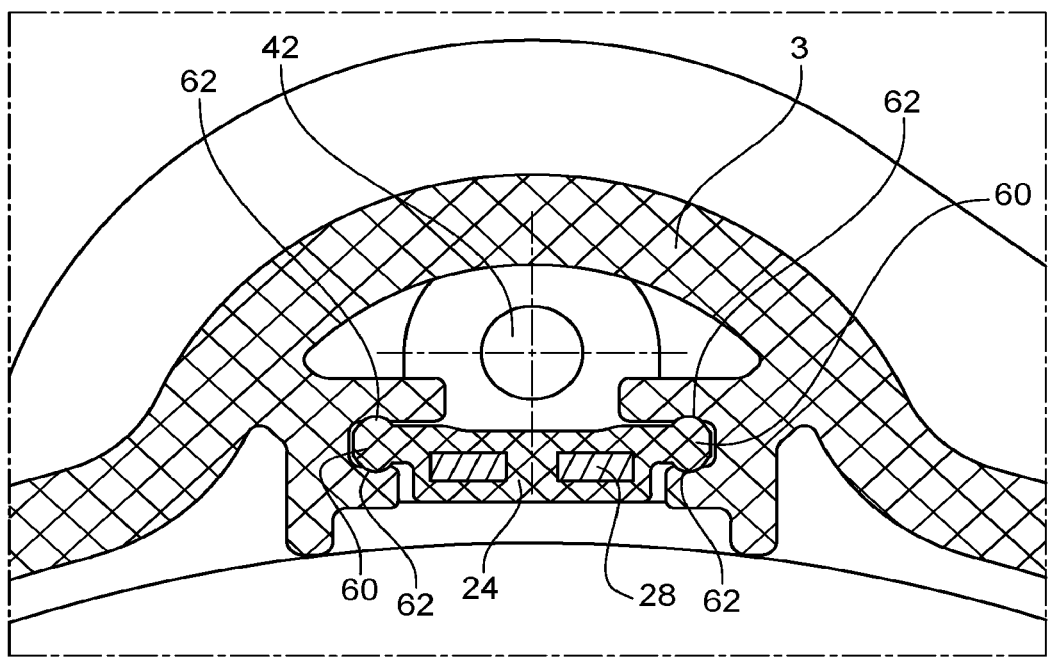
FIG. 10 shows a section view along the plane X-X in FIG. 7.
Figure 11:
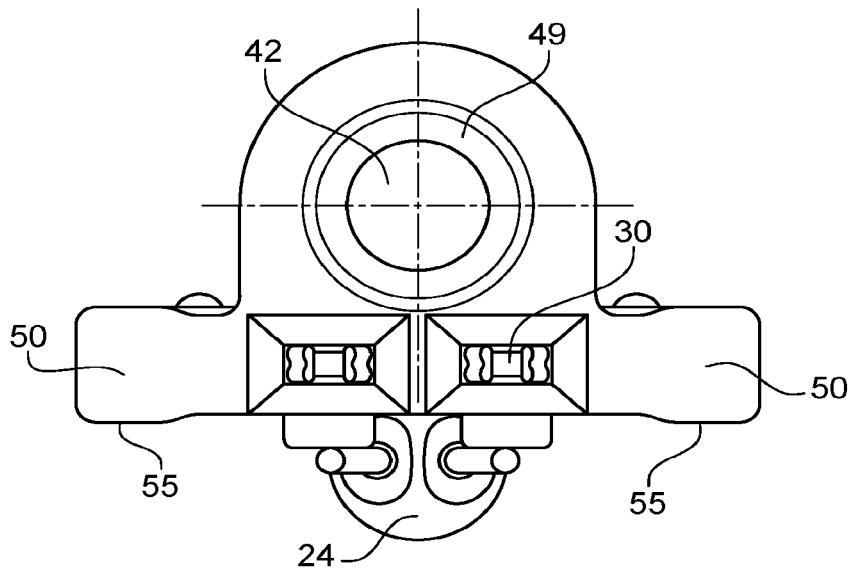
FIG. 11 shows that end of the temperature sensor assembly associated with a printed circuit board on an enlarged scale.
Figure 12A:
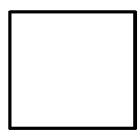
FIGS. 12a-12d show alternative refinements of the alignment mechanism.
Figure 12B:
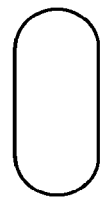
Figure 12C:
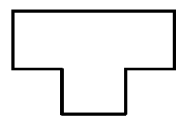
Figure 12D:
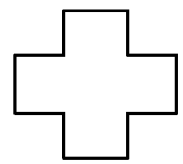
Figure 13:
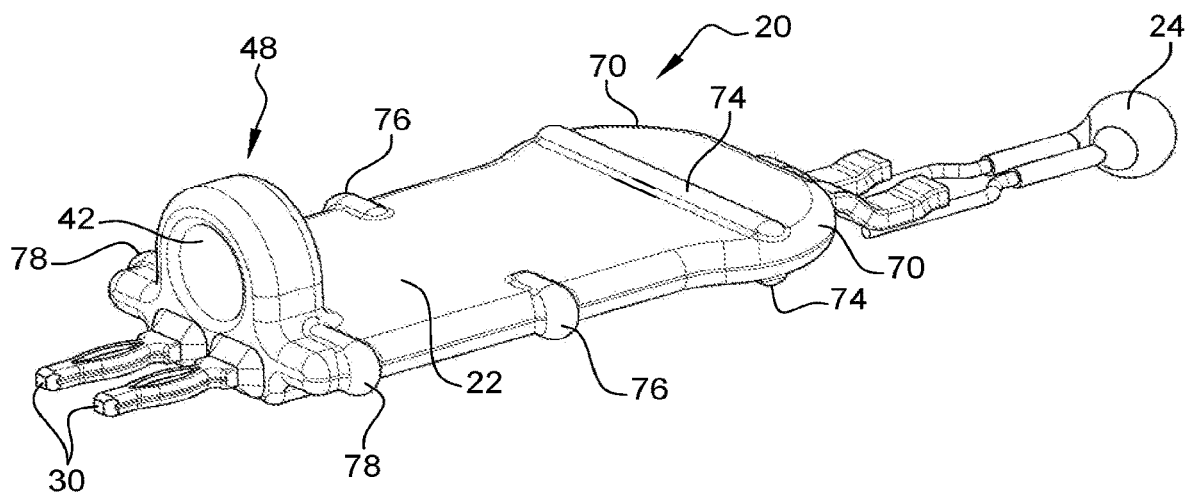
FIG. 13 shows a perspective view of a temperature sensor assembly used in the pump in FIG. 1 according to an alternative refinement.
Figure 14:
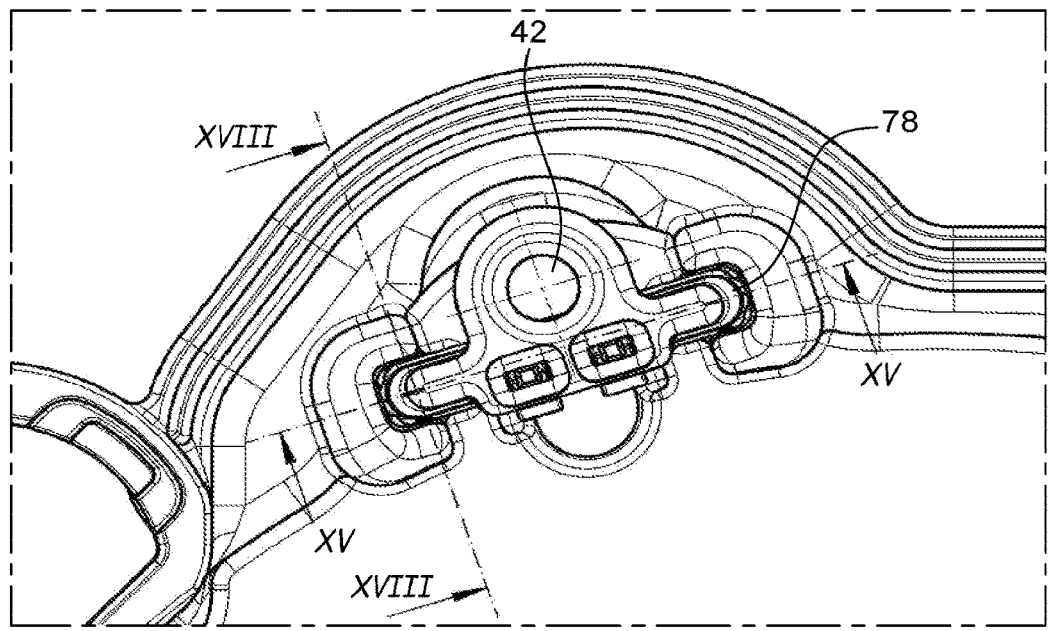
FIG. 14 shows a view similar to that in FIG. 8 of a pump comprising the temperature sensor assembly in FIG. 13.

During installation of the temperature sensor assembly 20, the clamping elements 62 become entrenched in the mutually opposite surfaces of the slot 34 in the motor housing 3 (see FIG. 6), so that the temperature sensor assembly 20 is positioned there precisely against a movement in the lateral direction with respect to FIG. 6 and is positioned precisely in the lateral direction with respect to FIG. 5 by means of the side faces of the positioning wings (also see FIG. 10).

In FIGS. 1 to 11, the alignment mechanism 40 has guide openings 42, 44 and a guide element 46 with a circular cross section in each case. This is advantageous inasmuch as at least the guide opening 44 can be made in the printed circuit board 13 with a low level of complexity, for example drilled. The disadvantage that the temperature sensor assembly 20 cannot be positioned in terms of its angular position relative to the printed circuit board by means of the alignment mechanism 40 is compensated for in the refinement according to FIGS. 1 to 11 by means of the rear sides 55 of the transverse bar 50 of the temperature sensor assembly 20; bearing of the rear sides 55 of the transverse bar 50 prevents the temperature sensor assembly 20 from rotating about its longitudinal axis.

FIGS. 12a to 12d show alternative refinements of the cross section of the guide openings 42, 44 and of the guide element 46. Each of these cross-sectional shapes (square, elongate hole, T-shaped and cross) is able to set the angular position of the temperature sensor assembly 20 relative to the printed circuit board in the desired manner. It is then not necessary to allow constructions similar to the rear sides 55 on the transverse bars 50 to interact with contact faces in the housing 3.

FIGS. 13 to 18 show a temperature sensor assembly 20 according to an alternative refinement. The same reference signs are used for the components and features known from the preceding embodiment and reference is made to the explanations above in this respect.

The main difference in the temperature sensor assembly 20 from the preceding embodiment is that here the "bottom side" of the carrier 22, that is to say the side facing the temperature sensor 24, serves as a stop when the said temperature sensor assembly is pressed into the slot 34. For this purpose, the bottom side of the carrier 22 is embodied as a stop 70 which is convexly expanded and can bear against a bottom face 72 of the slot 34.

Figure 15:
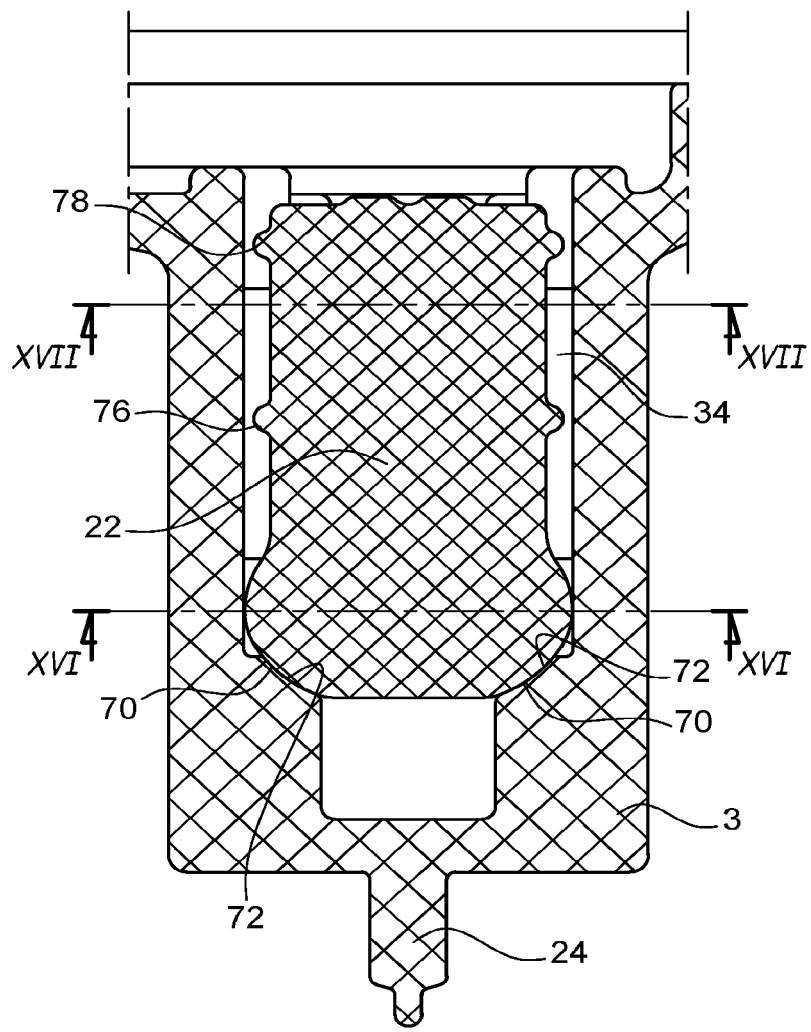
FIG. 15 shows a section view along the plane XV-XV in FIG. 13.

At the same time, the convex stop 70 is embodied to be as wide as the slot 34, so that it provides lateral guidance for the temperature sensor assembly 20 on the bottom of the slot (see, in particular, FIG. 15).

Figure 16:
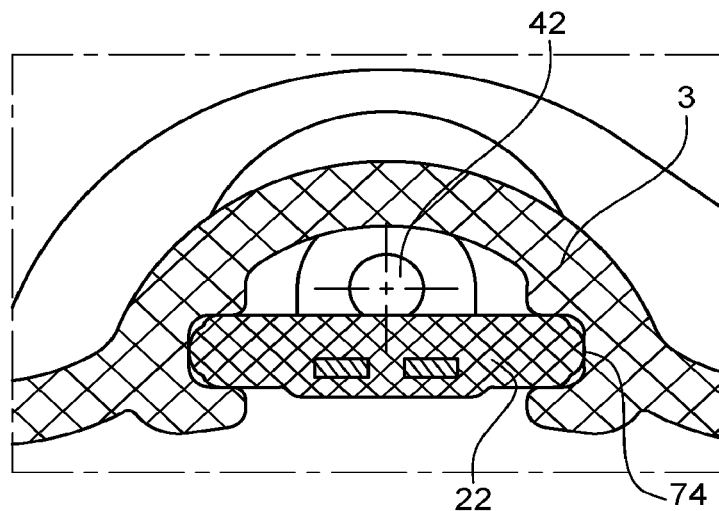
FIG. 16 shows a section view along the plane XVI-XVI in FIG. 15.
Figure 17:
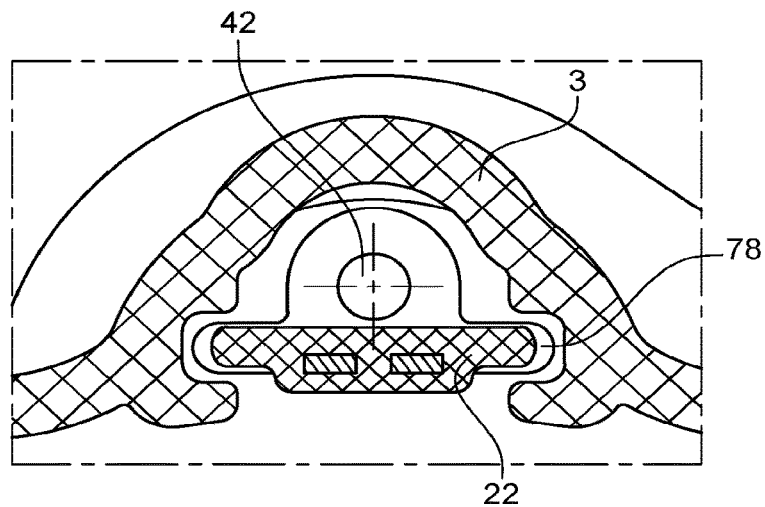
FIG. 17 shows a section view along the plane XVII-XVII in FIG. 15.
Figure 18:
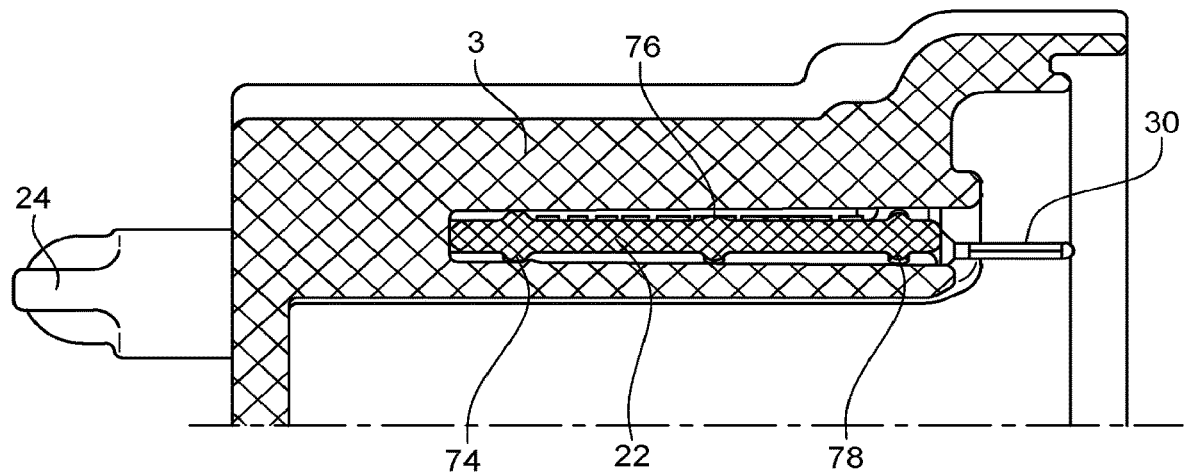
FIG. 18 shows a section view along the plane XVIII-XVIII in FIG. 14.

The convex stop 70 guides the temperature sensor assembly 20 transversely to the width of the slot 34 as well since it is provided with a transverse fin 74 which bears against the walls of the slot 34 (see, in particular, FIG. 16).

In the centre of the carrier 22 and on the side of the press-in contacts 30, the carrier is provided with further guide fins 76, 78 which protrude both in the thickness direction of the carrier 22 and laterally. However, these are dimensioned such that they exhibit a certain amount of play with respect to the walls of the slot 34 (see, in particular, FIGS. 15, 17 and 18), this allowing that end of the temperature sensor assembly 20 facing away from the temperature sensor 24 to be aligned in a suitable manner within the slot during assembly and during the press-in process.

Figure 19:
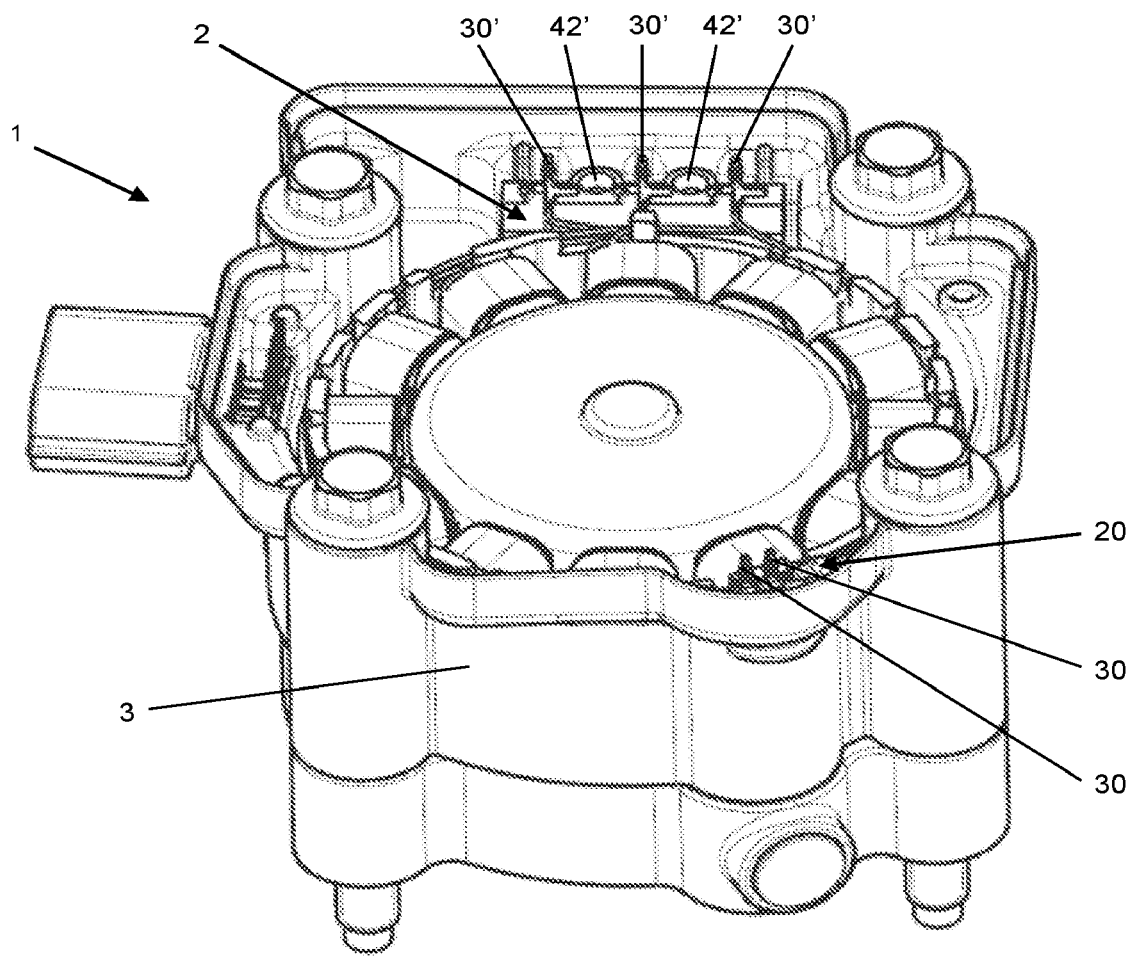
FIG. 19 shows a perspective view of the pump without the printed circuit board.
Figure 20:
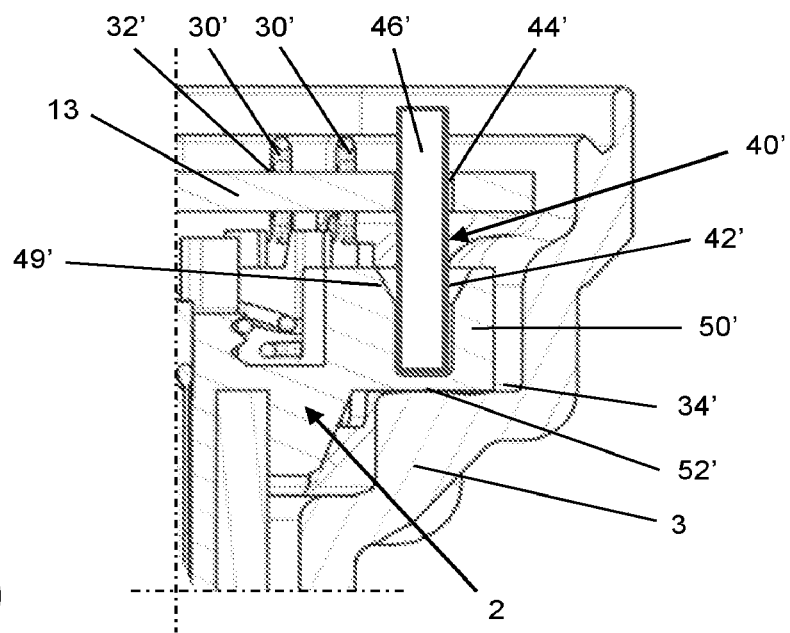
FIG. 20 shows a section view during an assembly step of the stator assembly.

Everything that has been described previously in connection with the temperature sensor assembly 20 applies to the stator assembly 2. FIGS. 19 and 20 illustrate such stator assembly 2 and the connection to the printed circuit board 13 in a similar way as described for the temperature sensor assembly 20. As the elements and the method for assembling are identical, the description is not detailed, only the numerical references on the FIGS. 19 and 20 are adapted.

The invention claimed is:

1. A liquid pump comprising:
a housing;
an electric motor formed by a stator assembly arranged in the housing and a rotor,
a liquid duct which provides a conduit to discharge liquid from the pump;
a printed circuit board; and
a temperature sensor assembly which is received in the housing and has a temperature sensor that is distal from the printed circuit board and arranged in the liquid duct,
wherein the stator assembly and/or the temperature sensor assembly having at least one press-in contact each of which engages into a respective press-in opening in the printed circuit board,
wherein an alignment mechanism is provided, by way of which the at least one press-in contact is directly aligned relative to the printed circuit board, the alignment mechanism comprising a first guide opening in at least one of the stator assembly and the temperature sensor assembly, and a second guide opening in the printed circuit board,
wherein the stator assembly and/or the temperature sensor assembly has/have at least one stop element which bears against a contact face on the housing, wherein the contact face limits a press-in depth of the stator assembly and/or the temperature sensor assembly and/or a rotation of the stator assembly and/or the temperature sensor assembly about an axis parallel to a press-in direction, and
wherein the stator assembly and/or the temperature sensor assembly has/have, on its side adjacent to the printed circuit board, a transverse bar which has the first guide opening and the stop element.

2. The liquid pump according to claim 1, wherein each of the first guide opening and the second guide opening has a circular cross section.

3. The liquid pump according to claim 2, wherein the first guide opening has an insertion bevel.

4. The liquid pump according to claim 2, wherein the stator assembly and/or the temperature sensor assembly is/are provided with at least one positioning wing which is received in a slot in the housing.

5. The liquid pump according to claim 2, wherein the stator assembly and/or the temperature sensor assembly is/are provided with a plurality of guide fins.

6. The liquid pump according to claim 1, wherein each of the first guide opening and the second guide opening has a cross section configured to provide non-rotatable engagement with a guide element.

7. The liquid pump according to claim 1, wherein the first guide opening has an insertion bevel.

8. The liquid pump according to claim 1, wherein the stator assembly and/or the temperature sensor assembly is/are provided with at least one positioning wing which is received in a slot in the housing.

9. The liquid pump according to claim 1, wherein the stator assembly and/or the temperature sensor assembly is/are provided with a plurality of guide fins.

10. A liquid pump comprising:
a housing;
an electric motor formed by a stator assembly arranged in the housing and a rotor,
a liquid duct which provides a conduit to discharge liquid from the pump;
a printed circuit board; and
a temperature sensor assembly which is received in the housing and has a temperature sensor that is distal from the printed circuit board and arranged in the liquid duct,
wherein the stator assembly and/or the temperature sensor assembly having at least one press-in contact each of which engages into a respective press-in opening in the printed circuit board,
wherein an alignment mechanism is provided, by way of which the at least one press-in contact is directly aligned relative to the printed circuit board, the alignment mechanism comprising a first guide opening in at least one of the stator assembly and the temperature sensor assembly, and a second guide opening in the printed circuit board,
wherein the stator assembly and/or the temperature sensor assembly is/are provided with at least one positioning wing which is received in a slot in the housing,
wherein the positioning wing is provided with two clamping elements which are arranged on mutually opposite sides of the positioning wing and bear against mutually opposite sides of the slot with prestress.

11. The liquid pump according to claim 10, wherein the stator assembly and/or the temperature sensor assembly has/have at least one stop element which bears against a contact face on the housing, wherein the contact face limits a press-in depth of the stator assembly and/or the temperature sensor assembly and/or a rotation of the stator assembly and/or the temperature sensor assembly about an axis parallel to a press-in direction.

12. The liquid pump according to claim 10, wherein two positioning wings are provided on opposite sides of the stator assembly and/or the temperature sensor assembly.

13. The liquid pump according to claim 10, wherein the stator assembly and/or the temperature sensor assembly has/have at least one stop element which bears against a contact face on the housing, wherein the contact face limits a press-in depth of the stator assembly and/or the temperature sensor assembly and/or a rotation of the stator assembly and/or the temperature sensor assembly about an axis parallel to a press-in direction.

14. The liquid pump according to claim 10, wherein each of the first guide opening and the second guide opening has a circular cross section.

15. The liquid pump according to claim 10, wherein each of the first guide opening and the second guide opening has a cross section configured to provide non-rotatable engagement with a guide element.

16. The liquid pump according to claim 10, wherein the first guide opening has an insertion bevel.

\* \* \* \* \*